Jan. 14, 1947.   B. G. W. BARTLETT   2,414,134
FLOATING ANNULAR TOOTHED GEARING
Filed Aug. 9, 1945
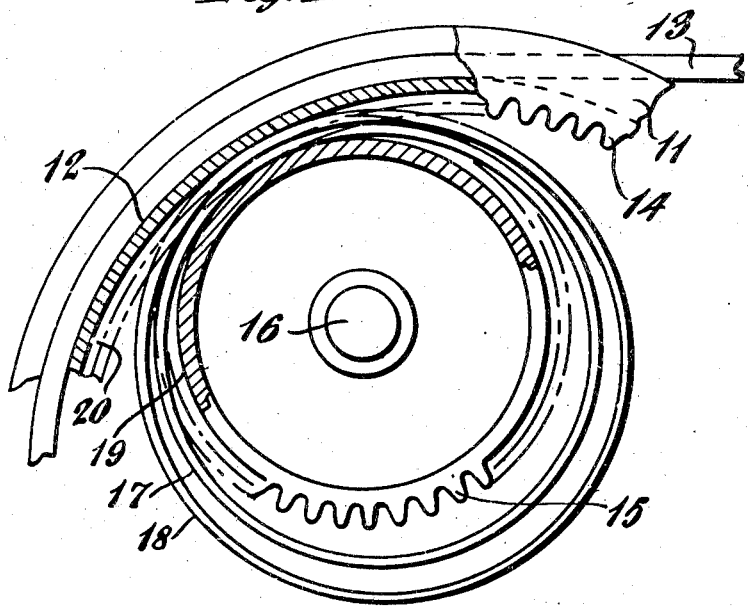
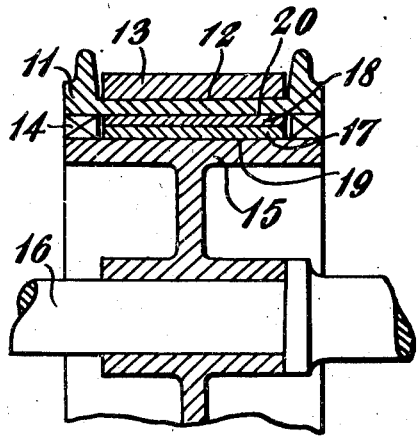
Inventor:
Benson George Willis Bartlett
by Fraser, Myers & Manley
his attorneys Patented Jan. 14, 1947

2,414,134

UNITED STATES PATENT OFFICE 2,414,134

FLOATING ANNULAR TOOTHED GEARING

Benson George Willis Bartlett, Darlington, England, assignor of one-half to Northern Patent Developments, Limited, Darlington, England, a company of Great Britain and Northern Ireland Application August 9, 1945, Serial No. 609,758
In Great Britain August 12, 1943

2 Claims. (Cl 74—413)

This invention relates to floating annular toothed gearing of the type wherein a toothed gear is disposed on the inner surface of an annular floating ring and is adapted to engage an externally toothed pinion, and an external gear comprising spur or sprocket teeth or pulley surface is provided externally of the said annular ring and is adapted to be engaged by a toothed gear wheel, a chain or a belt for the purpose of transmitting a drive to or from the said inner toothed pinion.

The object of the invention is to provide improvements in annular floating gearing of the type described.

Annular floating toothed gearing of the type described, according to this invention, is characterized in that the internal toothed gear of the annular ring and the coengaging toothed pinion are provided with loose rings disposed free and floating within grooves formed on the respective gears, the said rings abutting each other on the pitch circles of the gears, each of the rings having diameter different from that of the pitch diameter of its respective gear. The rings are further characterized in that they prevent relative lateral disengaging movement of the co-acting gears.

One form of the invention is illustrated in the accompanying drawing:

Fig. 1 is a fragmentary part sectional elevation; and

Fig. 2 is a corresponding transverse sectional elevation.

The annular floating ring 11 is provided with an external pulley surface 12, adapted to be engaged by a belt by which a drive is transmitted from a driving member (not shown), and an internal toothed gear 14 adapted to engage the teeth of a toothed pinion 15 mounted on a spindle 16 to which the said drive is to be transmitted.

Two rings 17 and 18 are mounted in an external circumferential recess 19 in the pinion 15, the ring 18 being outside the ring 17 and having an internal diameter greater than the external diameter of the ring 17, the ring 17 having an internal diameter greater than the external diameter of the recess 19 in the pinion 15 on which it is mounted. The outer ring 18 is also adapted to lie in an internal recess 20 in the annular ring 11, and its external diameter is less than the diameter of the recess 20.

When the internal gear 14 of the annular ring 11 is in mesh with the toothed pinion 15 the two rings 17 and 18 are disposed between the said gears, the thicknesses of the rings 17 and 18 being such that the point of contact between the internal surface of the outer ring 18 and the external surface of the inner ring 17 is on the pitch circles of the gears 14 and 15.

When transmitting a drive the annular floating ring will dip on the rings 17 and 18 into the return run of the belt, the ring 18 will in turn dip on to the ring 17 and the ring 17 on the toothed pinion, and the forward and return runs of the belt will be automatically placed under tension, and the possibility of serious belt slip will thereby be considerably reduced when transmitting a high velocity drive in this particular instance over small diameter co-acting sprockets, pulley surfaces or the like.

As will be seen in Fig. 2, the toothed gear 14 is formed in two portions, one at each edge of the floating ring 11 and the teeth of the toothed pinion 15 are similarly formed; the loose rings 17 and 18 are disposed between the two separate portions of the two engaging gears 14 and 15 and thereby prevent relative lateral disengaging movement of said gears.

It will be recognized that the means specified will be particularly efficient when the mechanism is functioning under excessive loads.

What I claim and desire to secure by Letters Patent is:

1. Annular floating toothed gearing wherein a toothed gear disposed on the inner surface of an annular floating ring is engaged by toothed gearing on a pinion and the external surface of the said annular floating ring is engaged by a member for the purpose of transmitting a drive through said pinion, the internal surface of said annular floating ring is annularly grooved, the diameter of said groove being greater than the pitch diameter of said internal gear on said annular floating ring, a first loose ring is disposed free and floating within said groove in said annular floating ring, the external diameter of said first loose ring being less than the diameter of said groove and the radial thickness of said first loose ring being equal to the difference between the diameter of said groove and the pitch diameter of said internal gear, the said pinion is circumferentially grooved, the diameter of said groove being less than the pitch diameter of the toothed gear on said pinion, a second loose ring is disposed free and floating within said groove in said pinion, the internal diameter of said second loose ring being greater than the diameter of said pinion groove, the radial thickness of said second loose ring being equal to the difference between the diameter of said pinion groove and the pitch diameter of the tooth gear on said pinion, the external diameter of said second loose ring being less than the internal diameter of said first loose ring, and the said second loose ring being disposed within said first loose ring so that the external surface of the second loose ring abuts the internal surface of said first loose ring at the point of engagement of said internal toothed gear on said annular floating ring with the toothed gear on said pinion, whereby the said two gears are restrained from meshing below their pitch circles.

2. Annular floating toothed gearing according to claim 1, wherein the said grooves on the said annular floating ring and on the said pinion are disposed between the lateral edges of the said toothed gears whereby portions of said toothed gears are disposed on both lateral sides of said grooves and said loose rings and whereby said loose rings operate to prevent relative lateral disengaging movement of the said two co-acting toothed gears and retain them in mesh.

BENSON GEORGE WILLIS BARTLETT.